Jan. 6, 1970 P. GERKE ET AL 3,488,751
TELECOMMUNICATION EXCHANGE SYSTEM WITH PROVISION FOR SPECIAL AND NORMAL FACILITY OPERATION THROUGH A SWITCHING NETWORK
Filed March 28, 1966
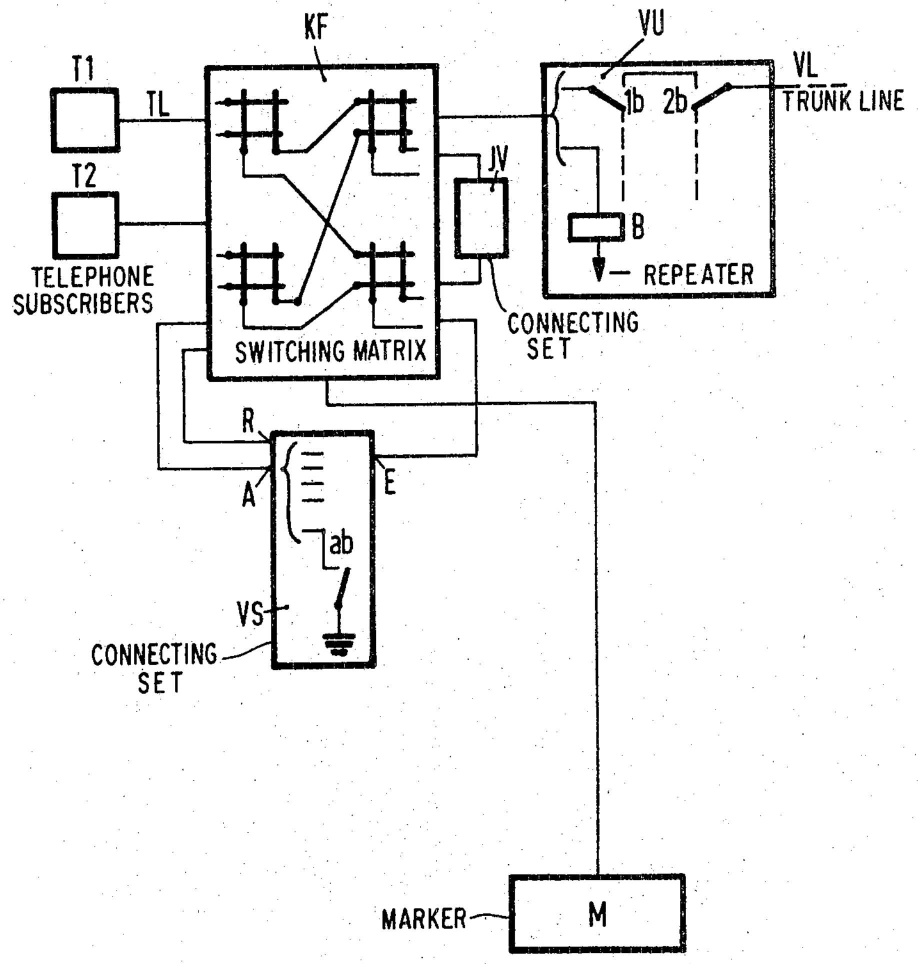

United States Patent Office 3,488,751

Patented Jan. 6, 1970

3,488,751
TELECOMMUNICATION EXCHANGE SYSTEM WITH PROVISION FOR SPECIAL AND NORMAL FACILITY OPERATION THROUGH A SWITCHING NETWORK

Peter Gerke, Munich, Karl Rutkowski, Pullach, near Munich, and Hans Baur, Munich, Germany, assignors to Siemens Aktiengesellschaft, Erlangen, Germany, a corporation of Germany Filed Mar. 28, 1966, Ser. No. 537,970
Claims priority, application Germany, Apr. 1, 1965, S 96,315
Int. Cl. H04m 3/22
U.S. Cl. 179—18 6 Claims

ABSTRACT OF THE DISCLOSURE

A telephone exchange system in which both normal and special facility operation, (such as interruption of the telephone connection for a consultation connection) are made through a switching matrix or network. The special facility operation is implemented by connection of a device therefor between the connection sides of the matrix, so as to be looped into the connection path.

GENERAL DESCRIPTION

This invention comprises an improved system for use in telephone exchange installations. The improved system provides for accomplishing switching operations in accordance with both common and special, or auxiliary, modes of operation. In the following description of the invention, common modes of operation will be understood to include recognition and response to the initiation of a call and completion of the call between subscriber substations, whether connected to a common central exchange, as in a local call, or to two remote exchanges, as in a long distance call. Special modes of operation will be understood to include monitoring for cost accounting, conference call capability, reconfirmation calls with shifting capabilities, and the like.

The system of the invention includes a bidirectional switching matrix through which various types of coupling paths may be established in completing demanded call connections and operations. The matrix may have a plurality of connecting lines connected thereto to connect associated subscribers to a corresponding plurality of input terminals of the matrix. A plurality of trunk lines may be connected to a corresponding plurality of output terminals of the matrix, and provide for connecting the exchange to remote central offices.

The matrix includes further input and output terminals to which are connected various types of apparatus or circuit systems for performing both common and special modes of operation. The matrix may be controlled by a central marker which responds to the dialed information received from a subscriber to effect the necessary coupling connections through the matrix for completing a call. If a local call is demanded—i.e., one in which both the calling and the called subscribers are connected to the same matrix, the marker responds to the dialed information to establish coupling paths through the matrix to connect an internal connection set into circuit between the two subscribers, thereby completing the call therebetween. Conversely, where the called subscriber is not connected to the same matrix, as in a long distance call, the marker selects an available trunk leading to a remote exchange installation to which the called subscriber is connected, and establishes a coupling path through the matrix connecting the calling subscriber with that trunk line.

Where special modes of operation are demanded by the calling subscriber, the marker establishes coupling paths through the matrix to insert into the connection circuit the necessary apparatus for effecting the demanded operation. For example, if during a previously established call connection, a reconfirmation call is demanded, the marker will insert reconfirmation apparatus into circuit in the completed call connection. The original call may be held in isolation during the reconfirmation call, and then resumed upon termination of the latter. The insertion of the auxiliary apparatus is accomplished by a single additional coupling through the matrix, and therefore requires only a minimum of extra equipment and is performed efficiently, and in a minimum time.

In prior art systems, the apparatus for effecting special modes of operation typically is connected in fixed circuit relationship with previously designated connection lines. The prior art systems therefore provide only a limited capability of selection of the special apparatus. By contrast, in the system of the invention, the apparatus for performing special functions are not connected in fixed circuit relationships but may be selectively switched into any desired circuit connection. As a result, maximum utilization of the apparatus is attained. The detrimental effect of line bundling which occurs with prior art systems is thereby avoided, and improved service to the subscribers at lower cost is achieved.

The selection capability of the matrix and maximum utilization of its associated apparatus and circuit systems permit reducing the amount of equipment required for a given installation, as compared to that required by prior art systems, with a consequent reduction in the cost of the installation. The matrix system of the invention permits consolidating and also simplifying the switching operations required for effecting both common and special modes of operation. For example, apparatus for accomplishing a special mode of operation is inserted into a previously completed call connection without the necessity of interrupting, or breaking the previously established connection. As a result, the complexity and cost of the switching control systems is reduced, and the increased efficiency of the system also contributes to reduced operating costs.

STATE OF THE PRIOR ART

In telephone exchange systems of the prior art, various circuit systems are employed in establishing a desired connection. For example, upon the initiation of a call by a subscriber, a relay connection set may be energized to provide direct current to the subscriber substation circuit. In addition, monitoring of the transmitting or calling subscriber substation circuit may be required for accounting purposes. Additional equipment is provided for establishing a ringing signal at the substation circuit of a receiving subscriber, and for recognizing a busy condition or answering at the receiving subscriber substation and, in the latter case, establishing audio or voice transmission circuits between the two subscriber substations. Supervisory circuits are also required for responding to termination of a call.

The various operations which may be required to be accomplished in a telephone installation may be represented by the individual steps of a common sequence of operations in completing a call. Upon a subscriber lifting the receiver of his telephone set, direct current power is supplied to his set. An indication, such as the common dial tone, is transmitted to the subscriber to indicate that a path is available for establishing a connection. The substaation circuit, in response to the subscriber's dialing, transmits dial information to a central switching location, such as a central office.

The equipment at the central office may take various forms and illustratively may include a line finder switch, a plurality of group selector switches and connector switches for selecting the appropriate transmission line to connect the calling subscriber with the desired receiving subscriber. The central office must also provide for ringing the set of the receiving subscriber and for responding to a busy condition or answering of the call at the receiving subscriber substation. In the latter case, the central office must complete the connection, perhaps monitor the connection for charge accounting purposes, and supervise the connection and release it when the call is terminated.

Special functions or auxiliary methods of operation may also be provided, and, for example, include: add-on connections; conference connections, i.e., connections between more than two subscribers; connections with interception of the calling subscriber; reconfirmation connections (i.e., maintaining a previously completed connection, which may be held in isolation, while completing a reconfirmation connection and upon termination of the latter, permitting return to the previous connection) with shifting capabilities; and the like. These special methods of operation require complex, expensive equipment.

Prior art systems providing special functions are very complex and expensive. The equipment for accomplishing the special functions has been provided heretofore either individually for each circuit system required for completing any given connection, or jointly with the aid of suitable connection means, such as selector dials and coupling members.

Special functions which are demanded only after an initial connection is completed require that the special apparatus be switched, or effectively looped into the existing connection. In presently existing systems, such switching operations require a large number of switching or commutation means, resulting in undesirably complex and expensive switching control mechanisms.

Present systems often provide for accomplishing special functions only in accordance with certain preselected routes which must be dialed by the calling subscriber. For example, in response to the dialing of preselected trunk identifying digits by the subscribers, a secondary installation to which the substation circuit is connected may recouple a partial connection from the calling subscriber to an internal connection circuit. A trunk line repeater having reconfirmation and shifting capabilities then may be substituted for, or connected in series with, the internal connection set. With such a system, the special operations are available to the subscriber only for certain traffic routes suitably equipped to provide them. Not only is inferior service thereby provided to the subscriber, the special apparatus is not utilized to its fullest extent. To provide such equipment for every trunk line results in excessive cost of the installation, and fails to provide full utilization of the equipment.

These and other disadvantages of the prior art systems are overcome by the switching matrix system of the invention.

OBJECTS OF THE INVENTION

It is therefore an object of this invention to provide an improved switching matrix system for use in a telephone exchange installation.

Another object of this invention is to provide an improved switching matrix system in a telephone exchange installation for connecting apparatus for accomplishing special functions into a completed circuit connection.

A further object of this invention is to provide a switching matrix system in a telephone exchange installation for inserting apparatus for performing special functions into a previously completed circuit connection.

Still a further object of the invention is to provide a switching matrix system in a telephone exchange installation which provides for accomplishing both common and special functions of the exchange.

These and other objects of the invention will become more apparent as the following description of the invention proceeds. For a better understanding of the invention, reference may be had to the single drawing hereof which indicates in block diagram form a telephone exchange installation including a switching matrix, illustrative subscriber substations, and apparatus connected to the matrix for selective coupling thereby into circuit with one or more of the substations for accomplishing common and/or special modes of operation.

In accordance with the invention, a plurality of subscribers only two of which, T1 and T2, are shown, are connected over connection lines such as TL to a corresponding plurality of input terminals at the input side of a switching matrix KF. At the output terminal on the output side of the matrix KF there is connected a repeater VU and a transmission line VL, which may represent a trunk line connecting the matrix to a remote exchange. The repeated VU may be a part of the central office in which the exchange is located. Although only a single repeater VU and associated trunk line VL are shown connected to the switching matrix KF, it is to be understood that a plurality of such repeaters and associated trunk lines may be connected in parallel and in a similar manner to a corresponding plurality of output terminals (not shown) on the matrix KF. The switching matrix KF provides for coupling each of the subscribers T1, T2, etc. to a selected, available one of the plurality of trunk lines connected thereto, for completing a call to a remote subscriber.

Both repeater VU and the matrix KF are capable of two-way, or bi-directional operation. Thus, the matrix KF also provides for coupling incoming signals from the trunk lines (transmitted from a remote calling subscriber, not shown) to the appropriate one of the subscribers T1, T2, etc.

Additional apparatus is also connected to the switching matrix KF. For example, connecting set VS, capable of performing a special function or mode of operation, is connected at its input E to an output terminal of the matrix KF, and at its outputs A and R to two input terminals of the matrix KF. Internal connecting set JV, which performs a common mode of operation termed "internal connection" (as in connecting two subscribers of the same exchange together, or connecting a marker of the exchange to a subscriber's line) is connected at its input and output terminals to respectively associated terminals on the output side of the matrix KF. In an actual system, a substantial number of each of the connecting sets JV and VS and of other apparatus is provided at each matrix KF, in accordance with the intended call handling capability of the installation and the special functions which it is designed to provide.

The internal connections between the input and output terminals of the matrix KF are controlled by a central marker M. The operation of the central marker M is well known in the art and will be understood herein to provide for both the establishment and release or termination of coupling paths or connections between the input and output terminals of the matrix KF in response to predetermined signal indications or information code demands from subscriber substations and from remote exchange installations demanding specified circuit operations.

It is to be understood that the input and output terminals and the internal circuit structure of the matrix KF, and the apparatus and connection lines associated therewith, are not intended to represent an actual circuit schematic, but only an illustrative block diagram of the system. In accordance with the explanation of the invention provided herein, the necessary circuit connections and system circuit schematic will be obvious to those skilled in the art. Further, the terms input and output terminals of the matrix KF are used merely for convenience and are not intended to indicate a limitation on the function of the matrix KF or of the system of the invention. As noted previously, the matrix KF is bidirectional. For example, in completing a connection from a transmission line VL or in completing an internal connection for a local call, the direction of signal transmission at the matrix terminal of the called subscriber renders the latter an output rather than an input terminal.

Internal connection

The matrix KF is capable of providing a connection between subscriber substations such as T1 and T2 which are directly connected to it, in completing what may be termed a local call. When a local call is commenced, for example by subscriber T1, the matrix KF couples the connection line TL to the internal connecting set JV. To accomplish this connection, upon the receiver being lifted, the substation circuit (not shown) of subscriber T1 produces an information signal which is applied initially to the marker M. The marker M thereupon selects an available internal connecting set apparatus JV and establishes a coupling path in the matrix KF connecting the apparatus JV to the subscriber line TL. The operation of the marker M for performing these functions is well known and therefore is not further described.

The apparatus JV transmits a dial tone to the subscriber line TL, whereafter the subscriber T1 may dial an information code corresponding to a local call to a desired receiving subscriber, such as T2. The information code is received by a register (not shown) which is temporarily connected together with the internal connecting set JV. The register transmits the information code to the marker M. In response to the dialed information code, the marker M establishes a second coupling connection through the matrix KF between the connecting set JV and the connecting line leading to subscriber T2. Subscribers T1 and T2 are thereby connected together, completing the local call.

Upon termination of the call between subscribers T1 and T2, which may be recognized by the replacing of the receiver by the calling subscriber T1, the marker M releases the coupling connections within the matrix KF, thereby freeing the internal connecting set JV previously employed in completing the circuit and freeing the substations (not shown) of subscribers T1 and T2 for subsequent operations.

As an alternative to the system disclosed, there may be provided registers which are independent of the internal connecting sets JV and which are connected into circuit with a calling subscriber only during transmission of a dial code. Such a register would then be switched out of the circuit when the local call connection is established. An alternative system of this type is the subject of the invention of our copending application entitled "Circuit Arrangement Providing Central Control for Telephone Exchange Installation," filed concurrently herewith, Ser. No. 537,914.

Outgoing external connection

The matrix KF, under control of the marker M, also provides for connection of a local subscriber such as T1 to other, or remote, subscribers who are not directly connected to the matrix KF. Such a connection may be termed a long distance call. These remote subscribers are available only through a trunk line such as VL, which connects the installation of the calling subscriber to the remote installation of the called subscriber.

In effecting such a connection, the connection line TL of the calling subscriber T1, for example, is initially coupled through matrix KF to internal connecting set JV under control of the marker M, as described above. Upon receipt of the dial code from the substation (not shown) of subscriber T1, indicating selection of a remote receiving subscriber, the marker M effects a recoupling in the matrix KF. The subscriber line TL is released from the internal connecting set JV and instead is coupled through the switching matrix KF to the repeater VU and the trunk line VL for connection to the exchange of the remote called subscriber.

The repeater VU may comprise part of the equipment at the central office, and includes apparatus, such as a register (not shown) for performing additional exchange functions. The register performs similar functions as the register (not shown) associated with the internal connecting set JV. In completing a long distance call, these functions would include temporary storage of the code information and subsequent transmission of the required information code for completing the long distance call connection.

As noted above, a plurality of repeaters VU and respectively associated transmission lines are connected to the output side of the matrix KF. In response to a dial code demanding a long distance connection, the marker M, in a well known manner, selects and seizes a free, or available, repeater VU and associated transmission line VL, out of the plurality thereof. In an actual system, a plurality of groups of repeaters VU and transmission lines VL would be provided, each group providing a number of trunk lines for a given route. Marker M therefore selects a free transmission line VL in the group thereof corresponding to the route designated by the dialed information code.

Incoming external connection

The repeater VU and the matrix KF are both bidirectionally operable and therefore are capable of receiving an incoming call from the transmission line VL and coupling it to the appropriate one of the subscribers T1, T2, etc. For this purpose ,a register (not shown) is associated with the repeater VU for receiving the dial information code arriving over line VL. The information code may represent, for example, the telephone number of the subscriber T1. When the arriving information code is completely received and stored in the register (not shown) of repeater VU, a control signal is transmitted to the marker M. The marker M, in response to the control signal, establishes a coupling connection through the switching matrix KF to the connecting line TL for completing the connection to the subscriber T1.

Auxiliary equipment for performing special functions

Subsequently to the establishment of a completed connection, it may be desired or become necessary to insert additional apparatus into the completed circuit for performing certain special functions. Examples of various special functions have been given above. The following description concerns the operation of the switching matrix KF in providing only one such special function, namely, that of consultation calls. Similar operations could, of course, provide for others of the special functions for which the apparatus is equipped. A consultation call requires that a first, previously completed call be held in isolation from the calling subscriber while the latter completes a second call. Upon termination of the second call, the calling subscriber may then return to the first, previously completed call.

For the purpose of this example, it shall be assumed that the subscriber T1 has established an outgoing external connection over the switching matrix KF, the connection repeater VU, and an assigned transmission line VL. Relay B of the repeater VU remain in its normal or rest position indicated during this connection.

When subscriber T1 desires to make a consultation call, he actuates a push button (not shown) associated with the ground potential wire of the connecting line TL. In a known manner, the grounding of the connection line TL is received and sensed as a control signal by the repeater VU and transmitted to the marker M. The ground signal criterion is recognized by the marker M as an order to insert into the completed connection between subscriber T1 and the repeater VU, a special connection apparatus providing for consultation calls.

Apparatus providing for consultation calls is well known in the art and it shall be assumed that the connecting set VS has this capability. In response to the ground signal, the marker M establishes a connection from subscriber T1 and through the switching matrix KF to input E of the consultation connecting set VS. The marker M further establishes a connection through the matrix KF from the output A of the apparatus VS to the line connected to the input of the repeater VU. When the insertion of apparatus VS is completed, the original direct coupling through the matrix KF between subscriber T1 and repeater VU is terminated. Thus, the consultation connecting set VS is inserted into the previously completed connection by means of a single additional coupling connection through the matrix KF.

In the circuit as now established, two individual connection apparatus or systems, namely the repeater VU and the supplemental apparatus VS, are coupled in series into the completed circuit. It is desirable, however, to limit the supervision of the lines TL and VL of the completed circuit to a single connection apparatus. When two connection systems are connected in a completed circuit, two feeding points or signal driving potentials are connected in series. As a result, coupling transformers and other equipment providing for suitable transformation of the direct current signals in the system become necessary. The system of the invention, however, eliminates this problem by removing the unnecessary one of the connection systems.

For this purpose, in the system disclosed, a control signal is produced by the connecting set VS to remove the repeater VU from the circuit. When the apparatus VS is coupled into the circuit by marker M, contact ab thereof is closed. In response to closing of contact ab, relay B of repeater VU is energized, moving the contacts 1*b* and 2*b* to engage a bypass circuit in the repeater VU, as indicated therein by the bar spanning the contacts 1*b* and 2*b*. As a result, the transmission line VL is connected through the bypass circuit, bypassing repeater VU, and coupled through the matrix KF and the auxiliary apparatus VS to the subscriber line TL.

The control signal for establishing the shunt or bypass circuit through repeater VU may be produced, in the alternative, directly by the marker M, rather than by apparatus VS, in response to the initial demand for the special function of set VS by subscriber T1.

The consultation apparatus VS is equipped with the necessary switching means, power supply means, such as a bridge supply circuit, and coupling and matching networks (not shown) for maintaining the coupling circuit between the lines TL and VL, to the exclusion of the repeater VU.

Connecting set VS also includes means (not shown) for transmitting dial tone to the calling subscriber T1. The speaking connection to connection line of trunk VL is now blocked. Upon receiving dial tone, the calling subscriber T1 dials the appropriate digits for establishing the consultation connection. The connecting set VS includes a second output R which is connected to an input terminal of the switching matrix KF in the same manner as a subscriber. The system operates in the manner described above to complete either an internal connection or an outgoing external connection in response to the dial code of the consultation call demanding a local or a long distance call, respectively.

For example, if the consultation call is to a local subscriber such as T2, the marker M establishes a first coupling path through the matrix KF to connect the output R of the apparatus VS to the apparatus JV, and a second coupling path through the matrix KF to connect the apparatus JV to the subscriber T2, thereby completing the consultation connection.

The internal connecting set JV includes a switching-through relay (not shown) such as the relay B of the repeater VU, which operates to remove the apparatus JV from the consultation circuit to prevent connection of its signal driving potential in series with that of apparatus VS. The apparatus VS independently performs the required functions in completing the consultation connection, such as establishing the calling current connection, acknowledging answer of the call by subscriber T2, acknowledging termination of the call, and providing a transfer capability for shifting the call.

It will be noted that the consultation dial code transmitted by subscriber T1 is received in the repeater VU, since the latter was already seized at the establishment of the original connection. However, the switching means for shifting the call through the consultation circuit—i.e., through the consultation connecting set VS and the internal connecting set JV to the subscriber T2—is not a portion of the repeater VU but rather is provided in the apparatus VS. As a result, a desired special operation is performed substantially exclusively by a single apparatus specifically designed to perform that function. Thus, in the example given, the apparatus VS itself provides for shifting the call from the repeater VU to the consultation path; the repeater VU need not include any circuits necessary to the consultation function, or any other special function. The greater simplicity of the individual circuit systems, such as repeater VU, not only reduces the cost thereof but facilitates the switching functions by which they are connected in completing either common or special function circuits.

A circuit system providing a special function, such as the apparatus VS, is utilized only when this special function is demanded by the subscriber. Further, it is apparent that each special circuit system is available to each subscriber associated with the matrix KF, without regard to the particular route required for a given call. As a result, maximum utilization of the special circuit systems is attained, with resultant reduction in the cost of the installation.

When the consultation circuit is terminated and the original connection is again established, the insertion of the consultation apparatus VS is no longer necessary. Marker M responds to termination of the consultation circuit to re-establish a direct connection through matrix KF between the calling subscriber T1 and the originally seized repeater VU, and to terminate the aforedescribed coupling path of the consultation circuit. As a result, reconfirmation connecting set VS is removed from the circuit and the switch ab opens, terminating the signal which controlled relay B of the repeater VU during the consultation call. Switches 1*b* and 2*b* return to their rest or normal positions, whereby repeater VU is again included in the circuit between subscriber T1 and the transmission line VL. Calling subscriber T1 thereupon may resume communication with the originally called remote subscriber.

It is to be understood that the aforedescribed insertion of consultation apparatus into a previously completed connection to a remote subscriber is illustrative of only one type of insertion function which may be accomplished by the matrix KF. Apparatus for performing other special functions may be inserted in a similar manner. In addition, the originally called subscriber and the subscriber called on a consultation call may each be either a local or a remote subscriber.

Numerous modifications and adaptations of systems of the invention will readily be apparent to those skilled in the art. For example, the system of the invention may be incorporated in a telephone exchange installation employing other, additional switching matrices, with all of the matrices having switching capabilities providing interconnection therebetween. To each of the additional matrices there may be connected additional, corresponding subscriber lines, connection lines and repeaters and other switching systems and special apparatus which may be required for establishing desired connections.

It will be evident that many changes could be made in the system of the invention without departure from the scope thereof. Accordingly, the invention is not to be considered limited to the particular embodiment disclosed herein but only by the scope of the appended claims.

It is therefore intended by the appended claims to cover all such modifications and adaptation as fall within the true spirit and scope of the invention.

What is claimed is:

1. A switching system for completing connections in a telephone installation providing selectable common and special functions in accordance with an information code demanding a selected one of said functions, including a switching matrix (KF) having first and second terminals and switching means controllable for providing connections between selected ones of said first and second terminals a plurality of subscriber circuits connected to said first terminals common function means (VU) connected to said second terminals of said matrix (KF) and special function means (VS) connected between said first and second terminals of said matrix (KF) and control means (M) operable in response to a code demand for a common function to establish a first coupling connection through said matrix (KF) to include said common function means (VU) in a completed common circuit connection with a subscriber circuit and operable in response to a code demand for a special function to release said first coupling connnection and establish a second coupling connection through said matrix to include, then through said special function means (VS), then through said matrix to said common function means in a completed special circuit connection.

2. A system as recited in claim 1 wherein there is further provided bypass means (B, 1b, 2b) in said common function apparatus (VU) operable in response to completion of said special circuit connection to remove said common function system (VU) from said series circuit.

3. A system as recited in claim wherein there is further provided a plurality of subscriber stations (T1, T2) connected through said subscriber circuits to a corresponding plurality of said first terminals of said matrix (KF), each operable to transmit an information code, and a further common function means (JV) providing an internal connection function and connected across a pair of said second terminals of said matrix (KF).

said control means establishing a coupling connection through said matrix (KF) for connecting a calling one of said subscribers (T1) with one of said common function means (JV, VU) in accordance with the demand of the information code from said calling subscriber (T1) in a completed circuit connection.

4. A system as recited in claim 3, wherein said control means is further operable to establish a further coupling connection through said matrix (KF) from said further common function means (JV) to a called subscriber (T2) connected to said matrix (KF) to provide a completed circuit connection between said calling and called subscribers (T1, T2) including said further common function means (JV) across said matrix (KF).

5. A telecommunications exchange system including a switching network having a pair of sides to which connections are made and operable to make connections therebetween.

a plurality of subscriber circuit connected to one side of said network.

a plurality of first devices (VU) connected to the other side of said network, one of which first devices is required for a normal facility operation connection;

and a plurality of second devices (VS), each connected to both of said pair of sides of said network, one of which second devices is demanded for a special facility operation connection by a signal transmitted by the subscriber during an existing normal facility operation connection.

the arrangement being such that in a normal facility operation connection, the subscriber circuit is connected to one of said first devices by way of a connection path across said network, and being such that the marker disconnects the normal facility operation connection and establishes a special facility operation connection between the subscriber circuit concerned and said first device by way of a first connection path across said network from said one subscriber circuit to one of said second devices, said one of said second devices, and a second connection path across said network from said one of said second devices to said one of said first devices.

6. A system as claimed in claim 5, wherein upon the establishment of a special facility operation connection during an existing normal facility operation connection, these connections are changed in such manner that the switching functions of the first device (VU) are taken over and maintained by the second device (VS) being used for a special facility operation connection.

References Cited

UNITED STATES PATENTS

| | | |
|---|---|---|
| 3,115,552 | 12/1963 | Fulwiler et al. |
| 1,675,886 | 7/1928 | Hague. |

OTHER REFERENCES

A. O. Adam, "No. 5 Crossbar Marker," Bell Lab. Record, November 1950, p. 502.

KATHLEEN H. CLAFFY, Primary Examiner

WILLIAM A. HELVESTINE, Assistant Examiner